United States Patent
Jarumaneeroj et al.

(10) Patent No.: US 10,919,991 B2
(45) Date of Patent: *Feb. 16, 2021

(54) HIGH PERFORMANCES MULTIMODAL ULTRA HIGH MOLECULAR WEIGHT POLYETHYLENE

(71) Applicants: Thai Polyethylene Co., Ltd., Bangkok (TH); SCG Chemicals Co., Ltd., Bangkok (TH)

(72) Inventors: Chatchai Jarumaneeroj, Bangkok (TH); Saranya Traisilanun, Bangkok (TH); Watcharee Cheevasrirungruang, Bangkok (TH); Piyawan Tiyapiboonchaiya, Bangkok (TH)

(73) Assignees: Thai Polyethylene Co., Ltd., Bangkok (TH); SCG Chemicals Co., Ltd., Bangkok (TH)

(*) Notice: Subject to any disclaimer, the term of this patent is extended or adjusted under 35 U.S.C. 154(b) by 9 days.

This patent is subject to a terminal disclaimer.

(21) Appl. No.: 16/332,029

(22) PCT Filed: Sep. 11, 2017

(86) PCT No.: PCT/EP2017/072686
§ 371 (c)(1),
(2) Date: Mar. 11, 2019

(87) PCT Pub. No.: WO2018/046713
PCT Pub. Date: Mar. 15, 2018

(65) Prior Publication Data
US 2020/0095404 A1    Mar. 26, 2020

(30) Foreign Application Priority Data

Sep. 12, 2016  (EP) .................................... 16188347

(51) Int. Cl.
*C08L 23/04*  (2006.01)
*C08F 2/01*  (2006.01)
(Continued)

(52) U.S. Cl.
CPC ............ *C08F 2/01* (2013.01); *B01D 19/0068* (2013.01); *B01J 8/008* (2013.01); *B01J 8/22* (2013.01); *C08F 2/001* (2013.01); *C08F 110/02* (2013.01); *C08F 210/16* (2013.01); *C08J 5/18* (2013.01); *C08L 23/04* (2013.01); *C08L 23/06* (2013.01); *B01J 2219/0004* (2013.01);
(Continued)

(58) Field of Classification Search
CPC ........ C08F 2/01; C08F 110/06; C08F 210/16; C08F 2/001; C08F 2500/01; C08F 2500/05; C08F 2500/12; C08F 2500/17; C08F 2500/02; C08L 23/04; C08L 23/06; C08L 23/0815; C08L 2297/068; C08L 2295/025; B01D 19/0068; C08J 5/18; C08J 2423/08; C08J 2423/06; B01J 8/008; B01J 2219/0004
See application file for complete search history.

(56) References Cited

U.S. PATENT DOCUMENTS 6,291,601 B1  9/2001  Debras
6,713,561 B1  3/2004  Berthold et al.
(Continued)

FOREIGN PATENT DOCUMENTS

EP    1041113 A1    10/2000
EP    1201713 A1    5/2002
(Continued)

OTHER PUBLICATIONS https://en.wikipedia.org/wiki/Charpy_impact_test (Year: 2020).*

*Primary Examiner* — Nathan M Nutter
(74) *Attorney, Agent, or Firm* — Banner & Witcoff, Ltd.

(57) ABSTRACT

The present inventions relates to a multimodal polyethylene composition comprising; (A) 30 to 65 parts by weight, preferably 30 to 50 parts by weight, most preferred 30 to 40 parts by weight of the low molecular weight polyethylene having a weight average molecular weight (Mw) of 20,000 to 90,000 g/mol or medium molecular weight polyethylene having a weight average molecular weight (Mw) of more than 90,000 to 150,000 g/mol; (B) 5 to 40 parts by weight, preferably 10 to 35 parts by weight, most preferred 15 to 35 parts by weight, of the first high molecular weight polyethylene having a weight average molecular weight (Mw) of more than 150,000 to 1,000,000 g/mol or the first ultra high molecular weight polyethylene having a weight average molecular weight (Mw) of more than 1,000,000 to 5,000,000 g/mol; and (C) 10 to 60 parts by weight, preferably 15 to 60 parts by weight, most preferred 20 to 60 parts by weight of the second high molecular weight polyethylene having a weight average molecular weight (Mw) of more than 150,000 to 1,000,000 g/mol or the second ultra high molecular weight polyethylene having a weight average molecular weight (Mw) of more than 1,000,000 to 5,000,000 g/mol, wherein a $MI_{21}$ of the multimodal polyethylene composition is less than 2.0 g/10 min, and a Charpy impact strength at 23° C. the of multimodal polyethylene composition is at least 70 kJ/m$^2$, preferably 70 to 120 kJ/m$^2$, measured by ISO 179, a sheet comprising the multimodal polyethylene composition as well as the use of the sheet.

20 Claims, No Drawings

(51) Int. Cl.

| | |
|---|---|
| *C08J 5/18* | (2006.01) |
| *C08L 23/06* | (2006.01) |
| *C08F 2/00* | (2006.01) |
| *C08F 110/02* | (2006.01) |
| *C08F 210/16* | (2006.01) |
| *B01J 8/22* | (2006.01) |
| *B01J 8/00* | (2006.01) |
| *B01D 19/00* | (2006.01) |

(52) U.S. Cl.
CPC ...... *C08F 2500/01* (2013.01); *C08F 2500/05* (2013.01); *C08F 2500/07* (2013.01); *C08J 2323/06* (2013.01); *C08J 2423/06* (2013.01); *C08J 2423/08* (2013.01); *C08L 2205/025* (2013.01); *C08L 2207/068* (2013.01)

(56) References Cited

U.S. PATENT DOCUMENTS

| | | | |
|---|---|---|---|
| 6,716,936 | B1 | 4/2004 | McGrath et al. |
| 8,759,448 | B2 | 6/2014 | Buryak et al. |
| 8,802,768 | B2 | 8/2014 | Dotsch et al. |
| 2003/0191251 | A1 | 10/2003 | McGrath |
| 2004/0204542 | A1 | 10/2004 | Mattioli et al. |
| 2006/0074194 | A1 | 4/2006 | Berthold et al. |
| 2009/0105422 | A1 | 4/2009 | Berthold et al. |
| 2009/0163679 | A1 | 6/2009 | Do Nascimento et al. |
| 2009/0304966 | A1 | 12/2009 | Mehta et al. |
| 2010/0010163 | A1 | 1/2010 | Berthold et al. |
| 2010/0016526 | A1 | 1/2010 | Etherton et al. |
| 2010/0035008 | A1 | 2/2010 | Backman |
| 2010/0092709 | A1 | 4/2010 | Joseph |
| 2010/0152383 | A1 | 6/2010 | Jiang et al. |
| 2010/0301054 | A1 | 12/2010 | Berthold et al. |
| 2014/0030460 | A1 | 1/2014 | Monoi et al. |
| 2015/0051364 | A1 | 2/2015 | Vahteri et al. |
| 2019/0225714 | A1* | 7/2019 | Jarumaneeroj et al. ... B01J 8/22 |

FOREIGN PATENT DOCUMENTS

| | | | |
|---|---|---|---|
| EP | 1460105 | A1 | 9/2004 |
| EP | 1417260 | B1 | 8/2005 |
| EP | 1578862 | B1 | 9/2005 |
| EP | 1655334 | A1 | 5/2006 |
| EP | 1576047 | B1 | 7/2006 |
| EP | 1576049 | B1 | 7/2006 |
| EP | 2017302 | A1 | 1/2009 |
| EP | 2072586 | A1 * | 6/2009 ........... C09D 123/06 |
| EP | 2130863 | A1 | 12/2009 |
| EP | 2354184 | A1 | 8/2011 |
| EP | 2407506 | A1 | 1/2012 |
| EP | 2365995 | B1 | 12/2012 |
| EP | 2743305 | A1 | 6/2014 |
| EP | 2668231 | B1 | 10/2014 |
| EP | 2907843 | A1 | 8/2015 |
| HU | 0800771 | A2 | 10/2010 |
| JP | 2012-067914 | A | 4/2012 |
| WO | 9618677 | A1 | 6/1996 |
| WO | 2004056921 | A1 | 7/2004 |
| WO | 2006092377 | A1 | 9/2006 |
| WO | 2006092378 | A1 | 9/2006 |
| WO | 2006092379 | A1 | 9/2006 |
| WO | 2007003530 | A1 | 1/2007 |
| WO | 2007042216 | A1 | 4/2007 |
| WO | 2007045415 | A1 | 4/2007 |
| WO | 2008006487 | A1 | 1/2008 |
| WO | 2008049551 | A1 | 5/2008 |
| WO | 2008131817 | A1 | 11/2008 |
| WO | 2009003627 | A1 | 1/2009 |
| WO | 2009077142 | A1 | 6/2009 |
| WO | 2009147022 | A1 | 12/2009 |
| WO | 2010025342 | A2 | 3/2010 |
| WO | 2012069400 | A1 | 5/2012 |
| WO | 2013101767 | A2 | 7/2013 |
| WO | 2013113797 | A1 | 8/2013 |
| WO | 2013144324 | A1 | 10/2013 |
| WO | 2013144328 | A1 | 10/2013 |
| WO | 2014091501 | A1 | 6/2014 |
| WO | 2015121161 | A1 | 8/2015 |

* cited by examiner

HIGH PERFORMANCES MULTIMODAL ULTRA HIGH MOLECULAR WEIGHT POLYETHYLENE

CROSS-REFERENCE TO RELATED APPLICATIONS

This application is a U.S. National Stage application under 35 U.S.C. § 371 of International Application PCT/EP2017/072686 (published as WO 2018/046713 A1), filed Sep. 11, 2017, which claims the benefit of priority to Application EP 16188347.5, filed Sep. 12, 2016. Benefit of the filing date of each of these prior applications is hereby claimed. Each of these prior applications is hereby incorporated by reference in its entirety.

The present invention relates to a multimodal polyethylene composition, a multimodal polyethylene for producing sheet and the use thereof.

The demand of polyethylene resins is increasingly being used in a variety of applications. As required high performance of polyethylene for a relatively new plastic. In order for balancing processability and physical properties of ethylene copolymers, the development in multimodal ultra high molecular weight polyethylene has been investigated.

EP 1 655 334 A1 discloses the multimodal production of an ethylene polymer which is produced in a multistage process with a $MgCl_2$-based Ziegler-Natta catalyst. The polymerization stages are performed in the following order to achieve firstly an ultra high molecular weight polymer, followed by achieving a low molecular weight polymer, and finally achieving high molecular weight polymer in the last step. The polymerization catalyst is charged to a prepolymerization step to make an ultra high molecular weight fraction.

WO 2013/144328 describes a composition of multimodal high density polyethylene which is produced using a Ziegler-Natta catalyst for use in molding applications. A small fraction of ultra-high polyethylene of less than 15% by weight is produced in a third reactor.

It is an object to provide a multimodal polyethylene composition overcoming drawbacks of the prior art, in particular having improved mechanical properties, such as Charpy index.

Ultra high molecular weight polyethylene (UHMWPE) is polyethylene with a molecular weight numbering in the millions, usually between 3.5 and 7.5 million. The high molecular weight brings the excellent mechanical properties in terms of abrasion resistance, impact resistance, fatigue resistance, and chemical resistance as compared to common engineering plastics. However, due to high molecular weight, it results in less efficient packing of the chains into the crystal structure as observed by densities which are less than high-density polyethylene (for example, 0.930-0.935 g/cm3). In addition, the major drawback of UHMWPE is processing. UHMWPE does not flow even above its melting temperature resulting in a difficulty to process by conventional extrusion, except ram extrusion.

The ultra high molecular weight polyethylene (UHMWPE) are well-known for plastic sheet fabrication in various applications due to excellent mechanical properties such as high abrasion resistance and impact strength. Normally, UHMWPE is not easy to process via convention extrusion. The specific machines and fabrication, for example, compression molding and ram extrusion are generally required.

Several reports have claimed that UHMWPE can improve the toughness and mechanical properties of polymers (abrasion, impact, tensile, low friction and others) by blending with other polymers such as polypropylene, polycarbonate, and conventional polyethylene. It is also well-known that UHMWPE forms separate islands in HDPE matrix and therefore leads to inhomogeneity in the final blend. When harsh compounding conditions or re-extrusions are applied to improve homogeneity, the degradation of the polymer chain occurs resulting in the reduction of ultrahigh molecular weight portion.

In WO2014/091501 A1, The blending of HDPE and UHMWPE can be improved the impact strength or tensile strain in HDPE. However, the morphology after blending is one of a key factor.

Blending of bimodal HDPE and UHMWPE were successfully done in WO 2015121161 A1 and EP2907843 A1. They claimed that the mechanical properties of bimodal HDPE were increased due to the fraction of UHMWPE. Moreover, the mixing can be prepared by extruder.

In EP2743305 A1, the blending between multimodal HDPE and UHMWPE was done. UHMWPE was added in multimodal HDPE pipe resin for improving the mechanical properties including sagging properties however multiple extrusion was required to improve homogeneity of the blend.

US 2009/0163679 A1 describes a process for producing multimodal ultrahigh molecular weight polyethylene. The polymerization is carried out by CSTR (continuous stirring tank reactor), wherein the molecular weight of each reactor was controlled by pressure, temperature, and hydrogen. Low molecular weight ethylene polymer can be obtained in the first reactor or second reactor. The first produced ethylene polymer was then transferred directly to second reactor.

However, also in light of the above prior art, there is still a need to provide multimodal polyethylene compositions for preparing UHMWPE and sheets prepared by using multimodal polyethylene compositions overcoming drawbacks of the prior art, in particular to provide high density polyethylene compositions for producing sheets having improved properties regarding charpy impact strength and abrasion resistance with improved homogeniety and processability.

Therefore, it is the object of the present invention to provide multimodal polyethylene compositions for preparing sheets and sheets prepared this way overcoming drawbacks of the prior art, in particular overcoming the drawbacks mentioned above.

This object is achieved in accordance with the invention according to the subject-matter of the independent claims. Preferred embodiments result from the sub-claims.

This object is achieved by a multimodal polyethylene composition comprising;

(A) 30 to 65 parts by weight, preferably 30 to 50 parts by weight, most preferred 30 to 40 parts by weight of the low molecular weight polyethylene having a weight average molecular weight (Mw) of 20,000 to 90,000 g/mol or medium molecular weight polyethylene having a weight average molecular weight (Mw) of more than 90,000 to 150,000 g/mol;

(B) 5 to 40 parts by weight, preferably 10 to 35 parts by weight, most preferred 15 to 35 parts by weight, of the first high molecular weight polyethylene having a weight average molecular weight (Mw) of more than 150,000 to 1,000,000 g/mol or the first ultra high molecular weight polyethylene having a weight average molecular weight (Mw) of more than 1,000,000 to 5,000,000 g/mol; and (C) 10 to 60 parts by weight, preferably 15 to 60 parts by weight, most preferred 20 to 60 parts by weight of the second high molecular weight polyethylene having a weight average molecular weight (Mw) of more than 150,000 to 1,000,000 g/mol or the second ultra high molecular weight polyethylene having a weight average molecular weight (Mw) of more than 1,000,000 to 5,000,000 g/mol wherein a MI21 of the multimodal polyethylene composition is 3.0 or less, preferably less than 2.0 g/10 min, and a Charpy impact strength at 23° C. the of multimodal polyethylene composition is at least 70 kJ/m², preferably 70 to 120 kJ/m², measured by ISO179.

Preferably, the multimodal polyethylene has the a Charpy impact strength at 23° C. from 78 to 90 kJ/m² measured by ISO179.

More preferred, the multimodal polyethylene has a MI21 from 0.01 to 1.5 g/10 min, preferably from 0.05 to 1.0 g/10 min, more preferably from 0.1 to 0.5 g/10 mim Most preferred, the multimodal polyethylene has an abrasion resistance in the range of 0.01 to 1.0%, preferably 0.01 to 0.6% and more preferable 0.01 to 0.3%, measured by ASTM D 4060.

It is preferred that the multimodal polyethylene composition has a weight average molecular weight from 300,000 to 5,000,000 g/mol, preferably 500,000 to 3,000,000 g/mol, measured by Gel Permeation Chromatography.

It is further preferred that the multimodal polyethylene composition has a number average molecular weight from 8,000 to 100,000 g/mol, preferably 10,000 to 80,000 g/mol measured by Gel Permeation Chromatography.

Also preferred is that the multimodal polyethylene composition has a Z average molecular weight from 2,000,000 to 10,000,000 g/mol, preferably 3,000,000 to 8,000,000 g/mol, measured by Gel Permeation Chromatography.

Preferably, the multimodal polyethylene composition has a density 0.930 to 0.965 g/cm3 according to ASTM D 1505 and/or an intrinsic viscosity from 4 to 30 dl/g, preferably 5 to 25 dl/g measured according to ASTM D 2515.

The object is further achieved by a sheet comprising the inventive multimodal polyethylene composition.

Furthermore, the object is achieved by the use of the inventive sheet as a liner, profiles, machinery or industrial part.

The object is further achieved by a reactor system for a multimodal polyethylene polymerization process, comprising;
(a) a first reactor;
(b) a hydrogen removal unit arranged between the first reactor and a second reactor comprising at least one vessel connected with a depressurization equipment, preferably selected from vacuum pump, compressor, blower, ejector or a combination thereof, the depressurization equipment allowing to adjust an operating pressure to a pressure in a range of 100-200 kPa (abs);
(d) the second reactor; and
(e) a third reactor.

Preferably, the depressurization equipment allows to adjust the operating pressure in the hydrogen removal unit to a pressure in the range of 103-145 kPa (abs), preferably 104-130 kPa (abs), most preferably 105 to 115 kPa (abs)

Preferably, the hydrogen removal unit further contains a stripping column for the separation of hydrogen and a liquid diluent.

The object is further achieved by a process for producing a multimodal polyethylene composition in an inventive reactor system, comprising (in this sequence);
(a) polymerizing ethylene in an inert hydrocarbon medium in the first reactor in the presence of a catalyst system, selected from Ziegler-Natta catalyst or metallocene, and hydrogen in an amount of 0.1-95% by mol with respect to the total gas present in the vapor phase in the first reactor to obtain a low molecular weight polyethylene or medium molecular weight polyethylene;
(b) removing in the hydrogen removal unit in the hydrogen removal unit 98.0 to 99.8% by weight of the hydrogen comprised in a slurry mixture obtained from the first reactor at a pressure in the range of 103-145 kPa (abs) and transferring the obtained residual mixture to the second reactor;
(c) polymerizing ethylene and optionally α-olefin comonomer in the second reactor in the presence of a catalyst system, selected from Ziegler-Natta catalyst or metallocene, and in the presence of hydrogen in an amount obtained in step (b) to obtain a first high molecular weight polyethylene or a first ultra high molecular weight polyethylene in the form of a homopolymer or a copolymer and transferring a resultant mixture to the third reactor; and
(d) polymerizing ethylene and optionally α-olefin comonomer in the third reactor in the presence of a catalyst system, selected from Ziegler-Natta catalyst or metallocene, and hydrogen, wherein the amount of hydrogen in the third reactor is in a range of 0.1-70% by mol, preferably 0.1-60% by mol with respect to the total gas present in the vapor phase in the third reactor or optionally substantial absence of hydrogen to obtain a second high molecular weight polyethylene or a second ultra high molecular weight polyethylene homopolymer or copolymer.

"Substantial absence" in this regard means that hydrogen is only comprised in the third reactor in an amount which cannot be avoided by technical means.

The slurry mixture obtained from the first reactor and subjected to the step of removing hydrogen in the hydrogen removal unit contains all of the solid and liquid constituents obtained in the first reactor, in particular the low molecular weight polyethylene or the medium molecular weight polyethylene. Furthermore, the slurry mixture obtained from the first reactor is saturated with hydrogen regardless the amount of hydrogen used in the first reactor.

Preferably, the removing is removing of 98.0 to 99.8% by weight of the hydrogen, and more preferable 98.0 to 99.5% by weight, most preferred 98.0 to 99.1% by weight.

Preferably, the α-comonomer comprised in the second reactor and/or in the third reactor is selected from 1-butene and/or 1-hexene.

Preferably, the operation pressure in the hydrogen removal unit is in the range of 103-145 kPa(abs) and more preferably 104-130 kPa (abs), most preferred 105 to 115 kPa (abs).

The weight average molecular weight (Mw) of the low molecular weight polyethylene, the medium molecular weight polyethylene, the high molecular weight polyethylene and the ultra high molecular weight polyethylene described herein are in the range of 20,000-90,000 g/mol (low), more than 90,000-150,000 g/mol (medium), more than 150,000-1,000,000 g/mol (high) and more than 1,000,000-5,000,000 g/mol (ultra high) respectively.

Therefore, the object is achieved by a multimodal polyethylene composition obtainable by the inventive process, comprising;

(A) 30 to 65 parts by weight, preferably 30 to 50 parts by weight, most preferred 30 to 40 parts by weight, of the low molecular weight polyethylene or medium molecular weight polyethylene;

(B) 5 to 40 parts by weight, preferably 10 to 35 parts by weight, most preferred 15 to 35 parts by weight, of the first high molecular weight polyethylene or the first ultra high molecular weight polyethylene; and (C) 10 to 60 parts by weight, preferably 15 to 60 parts by weight, most preferred 20 to 60 parts by weight of the second high molecular weight polyethylene or the second ultra high molecular weight polyethylene, wherein a $MI_{21}$ of the multimodal polyethylene composition is from 0.01 to 1.5 g/10 min, preferably from 0.05 to 1.0 g/10 min, more preferably from 0.1 to 0.5 g/10 mim, determined by ASTM D1238C, and a Charpy impact strength at 23° C. of the multimodal polyethylene composition is at least 70 $kJ/m^2$, preferably 70 to 120 $kJ/m^2$, more preferably 78 to 90 $kJ/m^2$, measured by ISO179.

The multimodal polyethylene preferably has an abrasion resistance in the range of 0.01 to 1.0% and preferably 0.01 to 0.6%, measured by ASTM D 4060.

In a preferred embodiment, the multimodal polyethylene composition can has a weight average molecular weight from 300,000 to 5,000,000 g/mol, preferably 500,000 to 3,000,000 g/mol, measured by Gel Permeation Chromatography.

Furthermore, it is preferred, that the multimodal polyethylene composition has a number average molecular weight from 8,000 to 100,000 g/mol, preferably 10,000 to 80,000 g/mol measured by Gel Permeation Chromatography.

Preferably, the multimodal polyethylene composition has a Z average molecular weight from 2,000,000 to 10,000,000 g/mol, preferably 3,000,000 to 8,000,000 g/mol, measured by Gel Permeation Chromatography.

Preferably, the multimodal polyethylene composition has a density 0.930 to 0.965 $g/cm^3$ according to ASTM D 1505 and/or an intrinsic viscosity from 4 to 30 dl/g, preferably 5 to 25 dl/g, measured according to ASTM D 2515.

Finally, the object is achieved by a sheet comprising the inventive multimodal polyethylene composition, wherein sheet can be used in many applications, for example, as a liner, profiles, machinery or industrial parts.

Most preferred, the sheets is obtained by a compression molding and/or extrusion and/or injection molding.

In preferred embodiments of the inventive reactor system, the inventive process and the inventive multimodal polyethylene composition "comprising" is "consisting of".

Regarding the inventive sheets, it is preferred that the sheets substantially comprises the inventive multimodal polyethylene composition, which means that the sheet does comprise further constituents only in amounts which do not affect the sheet performances regarding impact strength, abrasion resistance, and processability. Most preferred, the sheet is consisting of the inventive multimodal polyethylene composition.

In preferred embodiments "parts by weight" is "percent by weight".

The above embodiments mentioned to be preferred resulted in even more improved mechanical properties of the obtained multimodal polyethylene composition and the sheet prepared therefrom. Best results were achieved by combining two or more of the above preferred embodiments. Likewise, the embodiments mentioned above to be more or most preferred resulted in the best improvement of mechanical properties.

Surprisingly, it was found that by using the inventive reactor system to produce an inventive multimodal polyethylene composition by the inventive process allows to form an inventive sheet using the inventive composition which is superior over the prior art. In particular, it was found that by using the inventive multimodal polyethylene composition a sheet can be prepared with high impact strength and high abrasion resistance, good homogeneity and good processability.

The invention concerns a reactor system for multimodal polyethylene polymerization. The system comprises a first reactor, a second reactor, a third reactor and a hydrogen removal unit placed between the first reactor and the second reactor.

The hydrogen depleted polyethylene from the first reactor affects the polymerization of high molecular weight in the subsequent reactors. In particular, high molecular weight leads to improved mechanical properties of polyethylene that is the advantage for various product application includes injection molding, blow molding and extrusion. The catalyst for producing the multimodal polyethylene resin of this invention is selected from a Ziegler-Natta catalyst, a single site catalyst including metallocene-bases catalyst and non-metallocene-bases catalyst or chromium based might be used, preferably conventional Ziegler-Natta catalyst or single site catalyst. The catalyst is typically used together with cocatalysts which are well known in the art.

Innert hydrocarbon is preferably aliphatic hydrocarbon including hexane, isohexane, heptane, isobutane. Preferably, hexane (most preferred n-hexane) is used. Coordination catalyst, ethylene, hydrogen and optionally α-olefin comonomer are polymerized in the first reactor. The entire product obtained from the first reactor is then transferred to the hydrogen removal unit to remove 98.0 to 99.8% by weight of hydrogen, unreacted gas and some volatiles before being fed to the second reactor to continue the polymerization. The polyethylene obtained from the second reactor is a bimodal polyethylene which is the combination of the product obtained from the first reactor and that of the second reactor. This bimodal polyethylene is then fed to the third reactor to continue the polymerization. The final multimodal (trimodal) polyethylene obtained from the third reactor is the mixture of the polymers from the first, the second and the third reactor.

The polymerization in the first, the second and the third reactor is conducted under different process conditions. These can be the variation in concentration of ethylene and hydrogen in the vapor phase, temperature or amount of comonomer being fed to each reactor These can be the variation in concentration of ethylene and hydrogen in the vapor phase, temperature or amount of comonomer being fed to each reactor. Appropriate conditions for obtaining a respective homo- or copolymer of desired properties, in particularly of desired molecular weight, are well known in the art. The person skilled in the art is enabled on basis of his general knowledge to choose the respective conditions on this basis. As a result, the polyethylene obtained in each reactor has a different molecular weight. Preferably, low molecular weight polyethylene or medium molecular weight polyethylene is produced in the first reactor, while high molecular weight polyethylene or ultra high molecular weight polyethylene is produced in the second and third reactor respectively.

The term first reactor refers to the stage where the low molecular weight polyethylene (LMW) or the medium molecular weight polyethylene (MMW) is produced. The term second reactor refers to the stage where the first high or ultra high molecular weight polyethylene (HMW1) is produced. The term third reactor refers to the stage where the second high molecular weight polyethylene or ultra high molecular weight (HMW2) is produced.

The term LMW refers to the low molecular weight polyethylene polymer polymerized in the first reactor the weight average molecular weight (Mw) of 20,000-90,000 g/mol.

The term MMW refers to the medium molecular weight polyethylene polymer polymerized in the first reactor having the weight average molecular weight (Mw) of more than 90,000-150,000 g/mol.

The term HMW1 refers to the high or ultra high molecular weight polyethylene polymer polymerized in the second reactor having a weight average molecular weight (Mw) of more than 150,000 to 5,000,000 g/mol.

The term HMW2 refers to the high or ultra high molecular weight polyethylene polymer polymerized in the third reactor having the weight average molecular weight (Mw) of more than 150,000 to 5,000,000 g/mol.

The LMW or MMW is produced in the reactor, the absence of comonomer, in order to obtain a homopolymer.

To obtain the improved polyethylene properties of this invention, ethylene is polymerized in the first reactor in the absence of comonomer in order to obtain high density LMW polyethylene or MMW polyethylene having density ≥0.965 g/cm$^3$ and MI$_2$ in the range of 10-1000 g/10 min for LMW and 0.1-10 g/10 min for MMW. In order to obtain the target density and MI in the first reactor, the polymerization conditions are controlled and adjusted. The temperature in the first reactor ranges from 70-90° C., preferably 80-85° C. Hydrogen is fed to the first reactor so as to control the molecular weight of the polyethylene. The molar ratio of hydrogen to ethylene in the vapor phase can be varied depending up on the target MI. However, the preferred molar ratio ranges from 0.01-8.0, more preferably 0.01-6.0. The first reactor is operated at pressure between 250 and 900 kPa, preferably 400-850 kPa. An amount of hydrogen present in the vapor phase of the first reactor is in the range of 0.1-95% by mole, preferably 0.1-90% by mol.

Before being fed to the second reactor, the slurry obtained from the first reactor containing LMW or MMW polyethylene preferably in hexane is transferred to a hydrogen removal unit which may have a flash drum connected with depressurization equipment preferably including one or the combination of vacuum pump, compressor, blower and ejector where the pressure in the flash drum is reduced so that volatile, unreacted gas, and hydrogen are removed from the slurry stream. The operating pressure of the hydrogen removal unit typically ranges from 103-145 kPa (abs), preferably 104-130 kPa (abs) in which 98.0 to 99.8% by weight of hydrogen can be removed, preferably 98.0 to 99.5% by weight and most preferred 98.0 to 99.1% by weight.

In this invention, when 98.0 to 99.8% by weight of hydrogen is removed and the polymerization undergoes under these conditions of hydrogen content, very high molecular weight polymer can be achieved this way and Charpy Impact and Flexural Modulus are improved. It was surprisingly found that working outside the range of 98.0 to 99.8% by weight of hydrogen removal, the inventive effect of obtaining very high molecular weight polymer and improving Charpy Impact an Flexural Modulus could not be observed to the same extend. The effect was more pronounced in the ranges mentioned to be preferred.

The polymerization conditions of the second reactor are notably different from that of the first reactor. The temperature in the second reactor ranges from 65-90° C., preferably 68-80° C. The molar ratio of hydrogen to ethylene is not controlled in this reactor since hydrogen is not fed into the second reactor. Hydrogen in the second reactor is the hydrogen left over from the first reactor that remains in slurry stream after being flashed at the hydrogen removal unit. Polymerization pressure in the second reactor ranges from 100-3000 kPa, preferably 150-900 kPa, more preferably 150-400 kPa.

Hydrogen removal is the comparison result of the amount of the hydrogen present in the slurry mixture before and after passing through the hydrogen removal unit. The calculation of hydrogen removal is performed according to the measurement of gas composition in the first and the second reactor by gas chromatography.

After the substantial amount of hydrogen is removed to achieve the inventive concentration, slurry from the hydrogen removal unit is transferred to the second reactor to continue the polymerization. In this reactor, ethylene can be polymerized with or without α-olefin comonomer to form HMW1 polyethylene in the presence of the LMW polyethylene or MMW polyethylene obtained from the first reactor. The α-olefin comomer that is useful for the copolymerization includes $C_{4-12}$, preferably 1-butene and 1-hexene.

After the polymerization in the second reactor, the slurry obtained is transferred to the third reactor to continue the polymerization.

The HMW2 is produced in the third reactor by copolymerizing ethylene with optionally α-olefin comonomer at the presence of LMW or MMW and HWM1 obtained from the first and second reactor. The α-olefin comonomer that is useful for the copolymerization include $C_{4-12}$, preferably 1-butene and/or 1-hexene.

In order to obtain the target density and the target MI in the third reactor, the polymerization conditions are controlled and adjusted. However, the polymerization conditions of the third reactor are notably different from the first and second reactor. The temperature in the third reactor ranges from 68-90° C. preferably 68-80° C. Hydrogen is fed to the third reactor so as to control the molecular weight of polyethylene. Polymerization pressure in the third reactor ranges from 150-900 kPa, preferably 150-600 kPa, and is controlled by the addition of inert gas such as nitrogen.

The amount of LMW or MMW present in the multimodal polyethylene composition of the present invention is 30-65 parts by weight. HMW1 present in the polyethylene of the present invention is 5-40 parts by weight and HMW2 present in the polyethylene of the present invention is 10-60 parts by weight. It is possible that HMW1>HMW2 or HMW1<HMW2 depending on the polymerization conditions employed.

The final (free-flow) multimodal polyethylene composition is obtained by separating hexane from the slurry discharged from the third reactor.

The resultant polyethylene powder may be directly used or may then be mixed with antioxidants and optionally additives before being extruded and granulated into pellets.

Definition and Measurement Methods $MI_{21}$: Melt flow index (MI) of polymer was measured according to ASTM D 1238 and indicated in g/10 min that determines the flowability of polymer under testing condition at 190° C. with load 21.6 kg ($MI_{21}$).

Density: Density of polyethylene was measured by observing the level to which a pellet sinks in a liquid column gradient tube, in comparison with standards of known density. This method is determination of the solid plastic after annealing at 120° C. follow ASTM D 1505.

Molecular weight and Polydispersity index (PDI): The weight average molecular weight (Mw), the number average molecular weight (Mn) and the Z average molecular weight (Mz) in g/mol in g/mol were analysed by gel permeation chromatography (GPC). Polydispersity index was calculated by Mw/Mn. Around 8 mg of sample was dissolved in 8 ml of 1,2,4-trichlorobenzene at 160° C. for 90 min. Then the sample solution, 200 µl, was injected into the high temperature GPC with IRS, an infared detector (Polymer Char, Spain) with flow rate of 0.5 ml/min at 145° C. in column zone and 160° C. in detector zone. The data was processed by GPC One® software, Polymer Char, Spain.

Intrinsic Viscosity (IV): The test method covers the determination of the dilute solution viscosity of polyethylene at 135° C. or an ultra high molecular weight polyethylene (UHMWPE) at 150° C. The polymeric solution was prepared by dissolving polymer in Decalin with 0.2% wt/vol stabilizer (Irganox 1010 or equivalent). The details are given for the determination of IV according to ASTM D 2515. Viscometer molecular weight (MV) can be calculated based on IV as shown in equation below:

$$Mv = 5.37 \times 1.04 (IV)^{1.37}$$

Where Mv is viscometer molecular weight, η is intrinsic viscosity (dl/g).

Comonomer content: The comonomer content was determined by high resolution $^{13}$C-NMR. 13C-NMR spectra were recorded by 500 MHz ASCEND™, Bruker, with cryogenic 10 mm probe. TCB was used as major solvent with TCE-d2 as locking agent in the ratio of 4:1 by volume. The NMR experiments were carried on at 120° C., and the inverse gate 13C (zgig) of pulse program with 90° for pulse angle were used. The delay time (D1) was set to 10 seconds for full-spin recovery.

Crystallinity: The crystallinity is frequently used for characterization by Differential Scanning Calorimetry (DSC) follow ASTM D 3418. Samples were identified by peak temperature and enthalpy, as well as the % crystallinity was calculated from the peak area.

Shear Thinning Index (SHI): It gives an indication as molecular weight distribution of material. A common measurement runs viscosity at 190° C. using Dynamic rheometer using 25 mm diameter plate and plate geometry 1 mm gap. SHI(5/100) was calculated by viscosities at a constant shear rate at 5 l/s and 100 l/s. Generally materials have high SHI(5/100) means better flowability of material.

Viscosity at angular frequency 5 [l/s] and 100 [l/s] ($\eta_5$ and $\eta_{100}$): Rheological parameters are determined by using controlled stress rheometer model MCR-301 from Anton-Paar. The geometry is Plate-Plate 25 mm diameter at the measurement gap 1 mm. The dynamic oscillatory shear performs at angular frequency (w) 0.01-100 rad/s at 190° C. under nitrogen atmosphere. The sample preparation is performed to circular disk 25 mm by compression molding at 190° C. Viscosity at 0.01 [1/s] ($\eta_5$ and $\eta_{100}$) is obtained from complex viscosity at a specific shear rate 0.01 [1/s].

Charpy impact strength: The compressed specimen according to ISO 293 was prepared. Charpy impact strength is determined according to ISO179 at 23° C. and shown in the unit kJ/m$^2$.

Abrasion resistance: Preparation of specimen was done based on ISO 293 with sample size of 100 mm×100 mm×7 mm. Abrasion test was determined according to ASTM D4060. The ball head was selected as CS17 and cycle frequency is 1000 cycles. The percentage of weight loss (% L) of sample was determined as equation follows:

$$\% L = (A-B)/A*100$$

where A is weight of test specimen before abrasion, g, and B is weight of test specimen after abrasion, g.

Experimental and Examples

Composition-Related Examples

The medium or high density polyethylene preparation was carried out in three reactors in series. Ethylene, hydrogen, hexane, catalyst and TEA (triethyl aluminum) co-catalyst were fed into a first reactor in the amounts shown in Table 1. A commercial available Ziegler-Natta catalyst was used. The catalyst preparation is for example described in Hungary patent application 08 00771r. The polymerization in first reactor was carried out to make a low molecular weight polyethylene or medium molecular weight polyethylene. All of polymerized slurry polymer from first reactor was then transferred to a hydrogen removal unit to remove unreacted gas and some of hexane from polymer. The operating pressure in the hydrogen removal unit was be varied in a range of 100 to 115 kPa (abs) where residual hydrogen was removed more than 98% by weight but not more than 99.8% by weight from hexane before transferring to a second polymerization reactor. Some fresh hexane, ethylene and/or comonomer were fed into second reactor to produce first high molecular weight polyethylene (HMW1). All of polymerized polymer from second reactor was fed into the third reactor which produce second high molecular weight polyethylene (HMW2). Ethylene, comonomer, hexane and/or hydrogen were fed into the third reactor.

EXAMPLES

To prepare an inventive sheet from the above compositions, it was found that a sub-range of multimodal polyethylene compositions which might be obtained using the inventive reactor system are particularly preferred. In detail, the compositions suitable to form the inventive sheet are as follows and have the following properties. The following comparative examples refer to the sheet related compositions.

The inventive and comparative examples were prepared follow the process conditions explained in table 1. Most of UHMWPE samples were prepared in the way to provide improved melt processing comparable to general polyethylene. It was initially indicated by the ability to measure the melt flow index, MI$_{21}$. Then the compositions were prepared into the sheet and their properties were defined in table 1.

Inventive Example 1 (E1)

The inventive example 1 (E1) was produced to make the multimodal polyethylene composition as shown in table 2. A homopolymer was produced in the first reactor to obtain a medium molecular weight portion before transferring such polymer to hydrogen removal unit. The hydrogen removal unit was operated at pressure of 105 kPa (abs) to separate the unreacted mixture from the polymer. The residual of hydrogen from first reactor was removed to an extend of 98.9% by weight. The medium molecular weight polymer was then transferred to the second reactor to produce a first ultra high molecular weight polymer. Finally, produced polymer from second reactor was transferred to the third reactor to create a second ultra high molecular weight polymer. The second and third reactors are operated under hydrogen depleted polyethylene polymerization. The UHMWPE powder with IV of 9.0 dl/g was obtained without comonomer used in the composition.

Inventive Example 2 (E2)

The inventive example 2 (E2) was carried out in the same manner as Example 1 except that the comonomer feeding in the third ultra high molecular weight polyethylene as shown in table 2. The UHMWPE powder with IV of 23 dl/g was obtained with 1-butene comonomer used in the second ultra high molecular weight polyethylene produced in the 3$^{rd}$ reactor. The inventive example 2 with IV of 23 dl/g show the high impact strength and flexural modulus as compared to comparative samples, however, the melt flow index is unmeasurable due to high viscosity and high Mw.

Inventive Example 3 (E3)

The inventive example 3 (E3) was produced follow the inventive process to make the multimodal polyethylene composition as shown in table 2. The UHMWPE powder with IV of 8.4 dl/g was obtained with 1-butene comonomer used in the second ultra high molecular weight polyethylene produced in the 3$^{rd}$ reactor.

Comparative Example 1 (CE1)

A unimodal homopolymer was produced in the reactor to obtain an ultra high molecular weight polyethylene as shown in table 2. The UHMWPE powder with IV of 5.2 dl/g was obtained from the polymerization.

Comparative Example 2 (CE2)

The comparative example 2 (CE2) is the blend of a homo-polyethylene with commercial UHMWPE SLL-6 series. A homo-polyethylene powder with $MI_2$ of 26.2 g/10 min and IV of 1.5 dl/g was blended with UHMWPE powder with non-measurable $MI_{21}$ and IV of 20.3 by single screw extruder with the composition of 70 parts by weight of homo-polyethylene and 30 parts by weight of UHMWPE. The temperature profiles of single screw extruder were set at 210° C. to 240° C. from the barrel to the die. The blend was extruded and granulated into pellets with obtainable IV of 5.65 dl/g.

TABLE 1

Polymerization conditions for inventive example E1, E2, E3 and comparative example CE1

| | E1 | E2 | E3 | CE1 |
|---|---|---|---|---|
| $W_A$, % | 30 | 30 | 30 | 100 |
| $W_B$, % | 30 | 30 | 30 | — |
| $W_C$, % | 40 | 40 | 40 | — |
| First reactor | | | | |
| Polymerization type | Homo | Homo | Homo | Homo |
| Temperature, ° C. | 80 | 80 | 80 | 80 |
| Total pressure, kPa | 800 | 800 | 800 | 800 |
| Pressure, kPa (abs) | 105 | 105 | 105 | — |
| Hydrogen remove, % | 98.9 | 98.3 | 99 | — |
| Second reactor | | | | |
| Polymerization type | Homo | Homo | Homo | — |
| Temperature, ° C. | 70 | 70 | 70 | — |
| Total pressure, kPa | 400 | 400 | 400 | — |
| Third reactor | | | | |
| Polymerization type | Homo | Copo | Copo | — |
| Temperature, ° C. | 80 | 70 | 80 | — |
| Total pressure, kPa | 600 | 600 | 600 | — |

TABLE 2

Properties of polyethylene compositions

| | E1 | E2 | E3 | CE1 | CE2 |
|---|---|---|---|---|---|
| IV, dl/g | 9.0 | 23 | 8.43 | 5.2 | 5.65 |
| Butene content, % mol | — | 0.17 | 0.44 | — | — |
| Mv | 1,089,648.75 | 3,940,410.08 | 996,226.44 | 513,923.96 | 575,811.93 |
| Mw | 868,813.00 | 1,269,336.00 | 614,568.00 | 651,275.00 | 592,864.00 |
| Mn | 24,107.00 | 23,450.00 | 25,544.00 | 72,637.00 | 10,990.00 |
| PDI | 36.04 | 54.13 | 24.06 | 8.97 | 53.95 |
| Mz | 5,112,060.00 | 5,262,195.00 | 3,466,884.00 | 3,145,020.00 | 5,579,410.00 |
| $MI_{21}$, g/10 min | 0.15 | n/a | 0.30 | 0.14 | 1.134 |
| Density, g/cm$_3$ | 0.9534 | 0.9409 | 0.9472 | 0.9482 | 0.9631 |
| Tm, ° C. | 134 | 131.02 | 132 | 134 | 132 |
| Tc, ° C. | 120 | 117.76 | 119 | 121 | 120 |
| % X | 68.23 | 58.2 | 59.39 | 65.38 | 82.3 |
| Charpy impact 23 C., kJ/m2 | 84.4 | 85.41 | 83.59 | 75.42 | 5.65 |
| Abrasion resistance (% weight loss) | 0.1883 | 0.0100 | 0.1109 | 0.4058 | 0.0347 |
| Eta (5) Pa · s | 96725.76 | 98108.45 | 68870.71 | 98086.31 | 14758.06 |
| Eta (100) Pa · s | 9037.70 | 7630.77 | 7239.28 | 10239.12 | 2063.89 |
| SHI (5/100) | 10.70 | 12.86 | 9.51 | 9.58 | 7.15 |

The inventive examples E1 and E3 provide significantly improvement on mechanical properties including the charpy impact strength and abrasion resistance compare to the comparative examples CE1 and CE2. Both properties were enhanced by the ultrahigh molecular weight portion in the multimodal polyethylene compositions as observed as a function of Mw, and Mz on E1 and E3 even with higher $MI_{21}$ as compared to that of CE1. The abrasion resistance was even better when the 1-butene comonomer was applied into the compositions. The comparative example CE2 has very low impact strength. This may be affected by the inhomogeneity of the blend.

Samples can be measured with MI apparatus to define $MI_{21}$. It was noted that the inventive examples E1 and E3 containing much higher IV. The melt processability was further identified by the complex viscosity, $\eta_5$ and $\eta_{100}$ and shear thinning index, SHI (5/100). The lower melt viscosity was found in the inventive example E1 and E3 compared to CE1. The higher SHI was also observed in inventive examples E1 indicated the easier melt processing.

As compared to inventive sample CE1, it was noted that the inventive sample E2 contains the higher IV, Mw, and Mz, which reflects on the better abrasion resistance and charpy impact strength. It is important to note that $MI_{21}$ is unmeasurable in case of E2, however, the melt viscosity of E2 is comparable to CE1 even it has higher molecular weight. Moreover, the higher SHI can be observed in E2 which indicated the better performance of melt processing.

The specific multimodal polyethylene compositions enhance superior properties of sheet in particular the mechanical properties and processability.

The features disclosed in the foregoing description and in the claims may, both separately and in any combination, be material for realizing the invention in diverse forms thereof.

The invention claimed is:

1. A multimodal polyethylene composition comprising;
(A) 30 to 65 parts by weight of a low molecular weight polyethylene having a weight average molecular weight (Mw) of 20,000 to 90,000 g/mol or medium molecular weight polyethylene having a weight average molecular weight (Mw) of more than 90,000 to 150,000 g/mol;
(B) 5 to 40 parts by weight of a first high molecular weight polyethylene having a weight average molecular weight (Mw) of more than 150,000 to 1,000,000 g/mol or a first ultra high molecular weight polyethylene having a weight average molecular weight (Mw) of more than 1,000,000 to 5,000,000 g/mol; and
(C) 10 to 60 parts by weight of a second high molecular weight polyethylene having a weight average molecular weight (Mw) of more than 150,000 to 1,000,000 g/mol or a second ultra high molecular weight polyethylene having a weight average molecular weight (Mw) of more than 1,000,000 to 5,000,000 g/mol
wherein a $MI_{21}$ of the multimodal polyethylene composition is 3.0 or less, and
a Charpy impact strength at 23° C. of a compressed specimen of the multimodal polyethylene composition is at least 70 kJ/m², measured by ISO179;
wherein (A), (B), and (C) each have a different weight average molecular weight.

2. The multimodal polyethylene composition according to claim 1, wherein the Charpy impact strength at 23° C. of the compressed specimen of the multimodal polyethylene composition is from 78 to 90 kJ/m², measured by ISO179.

3. The multimodal polyethylene composition according to claim 1, wherein the multimodal polyethylene has a $MI_{21}$ from 0.01 to 1.5 g/10 min.

4. The multimodal polyethylene composition according to claim 1, wherein the specimen of the multimodal polyethylene composition has an abrasion resistance in the range of 0.01 to 1.0%, measured by ASTM D 4060.

5. The multimodal polyethylene composition according to claim 1, wherein the multimodal polyethylene composition has a weight average molecular weight from 300,000 to 5,000,000 g/mol, measured by Gel Permeation Chromatography.

6. The multimodal polyethylene composition according to claim 1, wherein the multimodal polyethylene composition has a number average molecular weight from 8,000 to 100,000 g/mol, measured by Gel Permeation Chromatography.

7. The multimodal polyethylene composition according to claim 1, wherein the multimodal polyethylene composition has a Z average molecular weight from 2,000,000 to 10,000,000 g/mol, measured by Gel Permeation Chromatography.

8. The multimodal polyethylene composition according to claim 1, wherein the multimodal polyethylene composition has a density 0.930 to 0.965 g/cm³, measured by ASTM D 1505 and/or an intrinsic viscosity from 4 to 30 dl/g, measured by ASTM D 2515.

9. Sheet comprising the multimodal polyethylene composition according to claim 1.

10. The sheet according to claim 8, wherein the sheet is a liner, a machinery part, or an industrial part.

11. The multimodal polyethylene composition of claim 1, comprising 30 to 50 parts by weight of the low molecular weight polyethylene.

12. The multimodal polyethylene composition of claim 1, comprising 10 to 35 parts by weight of the first high molecular weight polyethylene.

13. The multimodal polyethylene composition of claim 1, comprising 15 to 60 parts by weight of the second high molecular weight polyethylene.

14. The multimodal polyethylene composition of claim 1, wherein the $M_{21}$ of the multimodal polyethylene composition is less than 2.0 g/10 min.

15. The multimodal polyethylene composition of claim 1, wherein the Charpy impact strength at 23° C. of the compressed specimen of the multimodal polyethylene composition is from 70 to 120 kJ/m², measured by ISO179.

16. The multimodal polyethylene composition of claim 4, wherein the abrasion resistance is in the range of 0.01 to 0.6%, measured by ASTM D 4060.

17. The multimodal polyethylene composition of claim 5, wherein the weight average molecular weight is from 500,000 to 3,000,000 g/mol, measured by Gel Permeation Chromatography.

18. The multimodal polyethylene composition according to claim 6, wherein the number average molecular weight is from 10,000 to 80,000 g/mol, measured by Gel Permeation Chromatography.

19. The multimodal polyethylene composition according to claim 7, wherein the Z average molecular weight is from 3,000,000 to 8,000,000 g/mol, measured by Gel Permeation Chromatography.

20. The multimodal polyethylene composition according to claim 8, wherein the intrinsic viscosity is from 5 to 25 dl/g, measured by ASTM D 2515.

* * * * *